(No Model.)
C. T. BRANDON.
LOOSE PULLEY OILER.
No. 460,908. Patented Oct. 6, 1891.
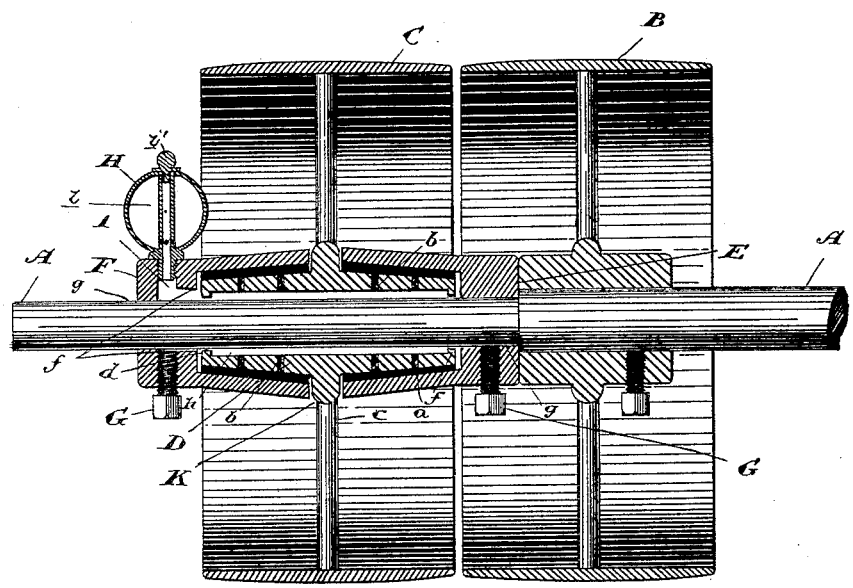
Witnesses
F. R. Cameron
H. J. McMillan
Inventor:
Chas. T. Brandon
by Donald C. Ridout & Co.
attys.

UNITED STATES PATENT OFFICE.

CHARLES T. BRANDON, OF TORONTO, CANADA.

LOOSE-PULLEY OILER.

SPECIFICATION forming part of Letters Patent No. 460,908, dated October 6, 1891.

Application filed December 11, 1890. Serial No. 374,382. (No model.)

*To all whom it may concern:*

Be it known that I, CHARLES THOMAS BRANDON, of the city of Toronto, in the county of York, in the Province of Ontario, Canada, have invented a certain new and Improved Loose-Pulley Bearing, of which the following is a specification.

The object of the invention is to provide a noiseless and durable double journal-box bearing for a loose pulley adapted for belt-shifting, whereby the pulley may be run economically at a high rate of speed without damage thereto and which will save the shaft from all wear of any description; also, means for lubricating the working parts without waste of oil or damage to the belting, and for excluding dust or dirt from the bearing-surfaces; and it consists in the peculiar construction, arrangement, and combinations of parts, hereinafter more particularly described, and then definitely claimed.

The drawing represents a sectional elevation of a loose pulley with my improved bearing and its companion tight pulley.

In the drawing the near halves of the pulley are cut away so as to expose the interior, and A is a shaft, to which the tight pulley B is fixed in the ordinary manner.

C is a loose pulley provided with a hollow hub D, to which the spokes c are attached, which hub I shape, preferably, in the tapered form indicated, so as to facilitate adjustment for wear, as hereinafter explained. The hub D is cored or hollowed out to form an oil-chamber $h$, the circular openings at the ends of the hubs where flanges or rings $d$ are formed being of sufficient diameter to permit of the free passage and rotation of the pulley-hub D on the shaft A without coming in contact with the surface thereof.

E and F are two cup-shaped box-bearings, each fixed to the shaft A by the set-screws G and cored out so as to fit closely over the shaft at each end of the hollow hub D. Babbitt metal $a$ is preferably cast into the interior of said cup-bearings E and F to simplify and cheapen the cost of fitting and to form anti-friction bearings for the hub D through the aperture K, left between the ends of the cup-shaped bearings E and F. The spokes $c$ or projection on the hub D are adapted to move, while the shaft and cup-shaped bearings are motionless.

$h$ is an oil-chamber formed in the interior of the hub D between the flanges $d$, from which the oil passes out and around either end of the hub D between the Babbitt metal in the cup-shaped bearings E and F and the external finished surface of the hub D, as well as passing by small holes $b$, perforating the hub D, filled with wicking, and leading also to the wearing parts between the hub and the cup-bearings.

H is an oil cup or feeder fixed to the outside cup-bearing, with a passage I leading to the oil-chamber $h$, formed between the hollow hub D and the shaft A.

Any suitable form of oil-cup may be used. The one shown is of a well-known style, having a perforated central tube $i$ and provided with a screw-plug $i'$, by which the passage of the oil from the cup is regulated.

By the foregoing means the bearings are gradually and continuously lubricated without inconvenience or waste from escaping oil, which is not the case with ordinary loose pulleys having interior journals on the shaft open at both ends.

It is well known that ordinary loose pulleys simply journaled on shafts soon wear out, both the shaft and the interior surface of the hub of the pulley wearing and causing the pulley to run in an irregular manner and rattle on the shaft and against the rim of the companion fixed pulley on the same shaft, thus soon necessitating the reboring and bushing of the hub and in most cases the returning of the shaft. By the adoption of my improved loose-pulley bearing I entirely prevent any wear on the shaft, the entire weight of the pulley and the belt-strain being carried on the bearings formed in the interior of the cup-bearings E and F, while in the event of any wear when the hub is made tapering, as shown, the contact between the hub and the cup-bearings may be readjusted by simply moving one of the cup-bearings E or F inwardly to the pulley, or in any case the cup-bearings may be rebabbitted. My invention also minimizes the waste of oil and any danger of wearing the bearing by running dry. The oil being retained within the inclosed bearings and journals until used up, is prevented from coming in contact with the belt and damaging it, and can only escape so as to properly lubricate the bearings.

The working parts of the device are completely incased, thus rendering it impossible for dust or dirt of any kind to come in contact with the bearing-surfaces.

By shifting the moving belt from pulley B to loose pulley C the shaft A ceases to rotate, and pulley C is carried round by the belt, the hollow hub D of the loose pulley rotating within the interior lubricated surfaces of the cup-shaped bearings E and F.

What I claim as my invention is—

1. A pulley having a hub tapered at both ends and bored larger than the shaft it is placed on, in combination with two cup-shaped bearings fixed to the shaft on either side of the pulley and extending over the hub to form an incased bearing, and the Babbitt lining for said bearings, substantially as and for the purpose specified.

2. The combination, with a loose pulley, of two hollow cup-shaped bearings fixed to a shaft on either side of the pulley, a hollow hub encircling said shaft, but not in contact therewith, and externally journaled on its exterior within cup-shaped bearings, an inclosed oil-chamber formed in the interior of the hub surrounding the surface of the shaft and supplied with oil from an oil-cup, and holes through said hub supplied with wicking, substantially as described, and for the purpose specified.

3. The combination, with the shaft A, of the loose pulley C, having the hollow tapered hub D, the adjustable cup-shaped bearings E and F, fixed to the shaft on either side of the pulley, the oil-chamber $h$, oil-cup H, and passage I, and holes $b$, perforating the hub D, substantially as described and specified.

4. The combination, with the shaft A and a loose pulley C, having a hollow perforated hub D free from contact with said shaft A and forming an oil-chamber $h$, of the cup-shaped bearings E and F, fixed to and revolving with said shaft A and babbitted at $a$ on their bearing-surfaces, and an oil-cup H, communicating with the chamber $h$, substantially as described.

5. The combination, with the loose pulley C, having the tapering hollow hub D, forming an oil-chamber $h$, of the cup-shaped bearings E and F, fixed to and revolving with the shaft A and forming hollow bearings for the hub, substantially as described and specified.

Toronto, November 20, 1890.

CHARLES T. BRANDON.

In presence of—
 CHARLES C. BALDWIN,
 JOHN E. CAMERON.